US005114890A

United States Patent [19]

Peterson

[11] Patent Number: 5,114,890

[45] Date of Patent: May 19, 1992

[54] ZIRCONIUM-CONTAINING COATING COMPOSITION

[75] Inventor: John R. Peterson, Salem, Oreg.

[73] Assignee: Teledyne Industries, Inc., Albany, Oreg.

[21] Appl. No.: 367,719

[22] Filed: Jun. 19, 1989

Related U.S. Application Data

[62] Division of Ser. No. 240,001, Sep. 2, 1988, Pat. No. 4,856,576.

[51] Int. Cl.[5] .............. C04B 35/48

[52] U.S. Cl. .............. 501/103; 106/38.9; 106/287.19; 106/286.4

[58] Field of Search .............. 106/287.19, 286.4, 38.9; 252/313.1; 501/103; 423/608

[56] References Cited

U.S. PATENT DOCUMENTS

| | | | |
|---|---|---|---|
| 3,359,213 | 12/1967 | Clearfield | 252/313.1 |
| 3,776,987 | 12/1973 | Grimes et al. | 252/313 |
| 4,102,691 | 7/1978 | Walters et al. | 501/103 |
| 4,196,769 | 4/1980 | Feagin | 106/38.27 |
| 4,342,597 | 8/1982 | Brown | 106/38.27 |
| 4,415,673 | 11/1983 | Feagin | 501/103 |
| 4,784,794 | 11/1988 | Kato | 106/286.4 |

FOREIGN PATENT DOCUMENTS

| | | | |
|---|---|---|---|
| 3095117 | 4/1988 | Japan | 423/608 |

*Primary Examiner*—William R. Dixon, Jr.
*Assistant Examiner*—C. Bonner
*Attorney, Agent, or Firm*—Shoemaker and Mattare, Ltd.

[57] ABSTRACT

A binderless coating comprising substantially pure zirconium oxide suspended in an aqueous zirconyl nitrate and ammonium hydroxide gel.

7 Claims, 1 Drawing Sheet

ZIRCONIUM-CONTAINING COATING COMPOSITION

This is a division of application Ser. No. 07/240,001, filed Sep. 2, 1988 now U.S. Pat. No. 4,856,576.

BACKGROUND OF THE INVENTION

This invention relates generally to vacuum arc melting and, more particularly, to vacuum arc melting furnace operation in the production of pure zirconium and specifically to crucible coatings used in the crucible of vacuum arc melting furnaces which are used in the production of pure zirconium.

Vacuum arc melting of electron beam welded compacts of zirconium metal sponge, chips or chunks have been employed conventionally to produce ingots of pure zirconium. The welded together compacts form an elongated cylinder which is used as the vertical electrode which is lowered into a copper crucible, which normally contains a water jacket for cooling and the melt is produced by the application of sufficient electrical power to completely arc melt the zirconium to form a melt which cools into an ingot conforming to the shape of the copper crucible.

In the production of zirconium ingots in vacuum arc melting furnaces, the cooled cylindrically shaped ingot is removed from the crucible, the ends squared, and the ingot turned on a lathe to remove the surface that has contacted the crucible. The ingot surface is machined to eliminate folds, laps and unevenness in the physical surface of the ingot as well as the hydrogen which alters the chemistry and physical properties of the zirconium metal. This later step is both time-consuming and costly. It has been necessary however, in the past, to make the surface smooth and to remove surface impurities, including zirconium which has been embrittled by hydrogen at and near the surface of the ingot. Typically there will be adsorbed in the ingot surface as much as 35 to 50 parts per million hydrogen due to the conditions encountered in the vacuum arc furnace. The hydrogen level should however, be less than 5 parts per million in order to eliminate cracking at the surface of the ingot in the forging operation. Both lower hydrogen levels and a smoother surface are necessary in order to eliminate the scalping operation and prevent cracking during forging.

Zirconium and many other reactive metals absorb hydrogen in large amounts to form hydrides.(1) The absorption of hydrogen into zirconium and/or these other metals alters their physical properties from soft, ductile, malleable metals to hard brittle intermetallic compounds. This property of absorbing hydrogen has been known and used for some time to make powders of otherwise ductile metals. Hydrogen may be absorbed or desorbed in a range of temperatures from 250° C. up to 850° C. Desorption is usually accomplished at the higher temperatures while evacuating the furnace by means of vacuum pumps or a combination of a sweep gas and vacuum pumping. A reactive metal may be hydrided by heating under hydrogen atmosphere at greater than 250° C. but less than 600° C. and then cooling to room temperature. The hydrided metal is the crushed to powder and the powder heated in vacuum to dehydride and return the metal to its ductile form. Very small amounts of hydrogen can promote cracking in zirconium when undergoing normal fabrication techniques.

(1) Metal Hydrides, William M. Mueller, James P. Blackledge, George. Libowitz. Academic Press, N.Y. and London 1968

Generally less than 5 parts per million is the preferred level to avoid fabrication problems such as cracking in zirconium.

In a process which produces 18,000 lb. ingots, the squaring and surface removal operation may require removal of as much as 1,000 lbs. of zirconium metal. This is a significant amount of scrap which needs to be recycled and which would be desirable to avoid or eliminate.

It is, therefore, an objective of the present invention to provide a method of making a coating composition and a coating composition which does not introduce impurities into the surface of a zirconium ingot and helps in the prevention of hydrogen absorption by providing an environment which promotes desorption to less than five parts per million.

It is a further objective of the present invention to provide a new method of making zirconium ingots by melting compacts of zirconium metal in a vacuum arc furnace which ingots exhibit less hydrogen embrittlement at the surface, thereby requiring less removal of surface metal to obtain a pure zirconium ingot with a sound surface.

It is a further object of the present invention to provide a vacuum arc furnace crucible with a coating which has better heat insulating properties than prior coatings, thereby producing an improved method of making zirconium ingots by enabling higher melt rates to be achieved during the production of zirconium ingots from zirconium compacts in a vacuum arc melting furnace.

BRIEF SUMMARY OF THE INVENTION

Figure 1:
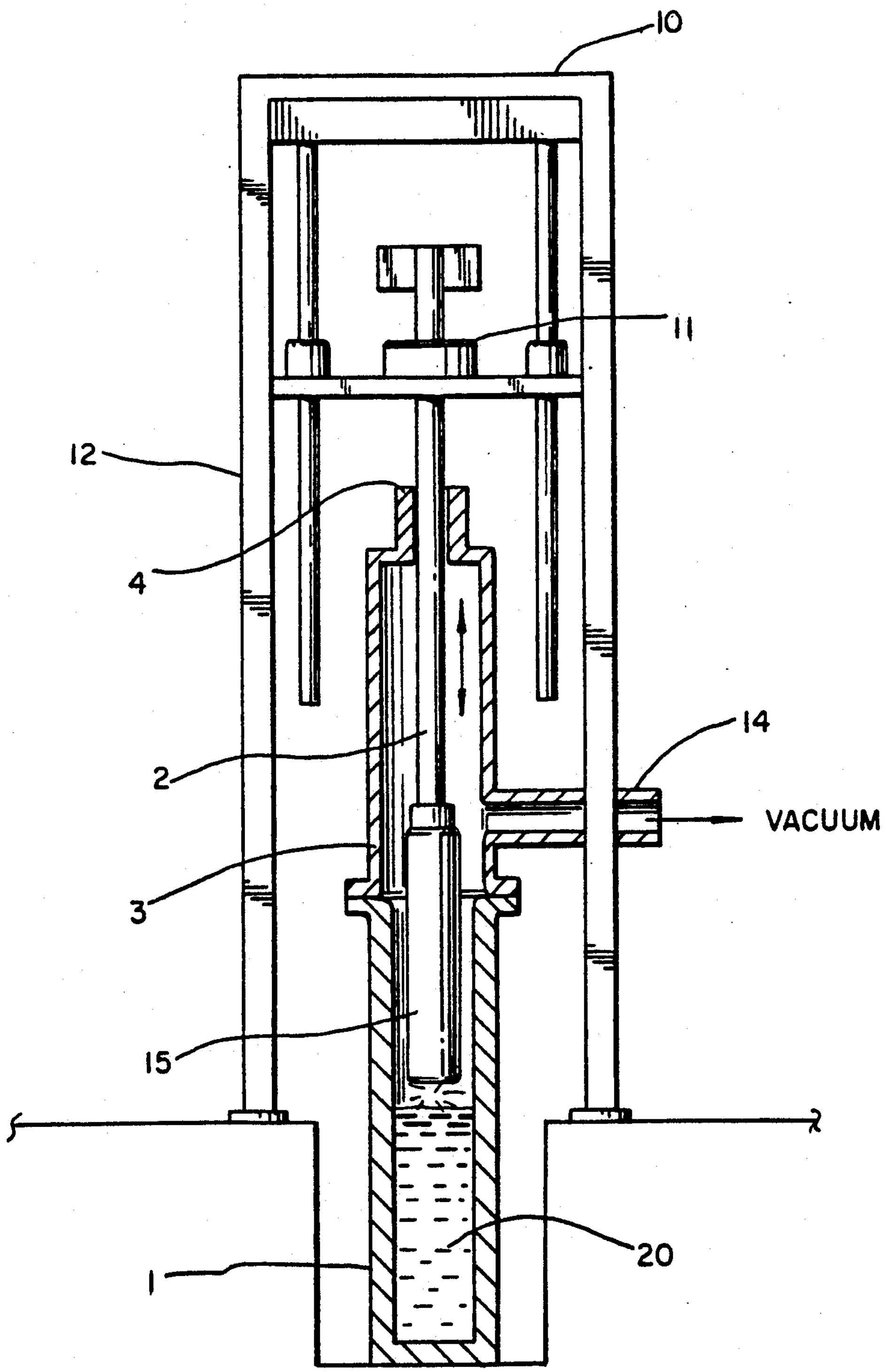
FIG. 1 is a schematic illustration of a typical vacuum arc melting furnace used in the production of zirconium.

The foregoing and other objects and advantages of the present invention, as will be more fully described hereinafter, are achieved by providing a paint or coating composition which contains only pure zirconium containing compounds, and a small amount of $NH_4(OH)_2$ and acid, which composition is capable of being applied to the vertical walls of a vacuum arc furnace copper crucible to form a stable, substantially uniform, coating thereon. The zirconium coating composition of the present invention is free of aluminum and aluminum compounds and consists essentially of zirconium oxide suspended in a water-based zirconyl nitrate gel, to which small amounts of base and acid have been sequentially added.

DETAILED DESCRIPTION OF THE INVENTION

Pure zirconium compounds, i.e., zirconium oxide and zirconyl nitrate, are employed in the preparation of the coating composition of the present invention in order to eliminate the introduction of spurious impurities into the surface of the zirconium ingot formed during vacuum arc melting of a zirconium compact.

The composition is prepared by dissolving $ZrO(NO_3)_2$ (zirconyl nitrate) in water and then adding sufficient $NH_4OH$ (ammonium hydroxide) in sufficient quantity to adjust the pH of the solution to a value of from between about 8 to about 11 to form a gel. A preselected quantity of finely divided zirconium oxide is then added to the gel to form a stable suspension of $ZrO_2$ in the gel formed by $ZrO(NO_3)_2 2H_2O$ and $NH_4OH$.

Nitric Acid ($HNO_3$) is then added in sufficient quantity to adjust the pH of the gel suspension to a value of from about 3 to about 4.

Preferably between about 3 Kg and 50 Kg of $ZrO_2$ can be suspended for each kilogram of $ZrO(NO_3)_2$ used in gel formation. Most preferably about 22 Kg of $ZrO_2$ per Kg of $ZrO(NO_3)_2$ is used. The finely divided zirconium oxide is 100%-325 mesh, preferably sized from about 10 microns to less than 1 micron, in size with the best results being obtained from powders with a median particle size of less than 7 $\mu m$ and preferably less than 5 $\mu m$ (micrometers, $10^{-6}$ m).

To prepare the gel, each Kg of zirconyl nitrate is dissolved in five (5) liters of water to produce a gel capable of suspending the $ZrO_2$ which most preferably results in a final composition containing, for each Kg of $ZrO_2$, approximately 0.22 liters of water.

The final suspension is self-supporting when applied to the inside vertical walls of the copper crucible used in vacuum arc melting. It forms a substantially uniform coating without objectionable sag and with superior adhesion to the prior composition. Without being bound to any specific theory, it is believed that the acidic nature of the composition after preparation and acidification modestly attacks the copper substrate making a surface suitable for bonding of the gel suspension to the substrate.

Referring to FIG. 1 a typical arc melting furnace 10 is illustrated schematically showing a crucible 1, an electrode holder 2 and a vacuum tight housing 3. The housing 3 is attached to the top of the crucible 1 in a manner to provide an air tight fit. Also the electrode holder is axially and vertically mounted in the housing 2 and extends through the top of the housing 2 through a vacuum tight seal at 4. A support structure 12 is provided for housing a means 11 for moving the electrode holder 2 vertically up and down through the top of the housing 3. The electrode compact 15 is mounted on the lower end of the electrode holder 2 at a height near the top of the melt 20 so that during the application of sufficient electric current an arc is drawn between the melt 20 and the electrode compact 15 and the electrode compact 15 melts or is consumed and condenses into the melt 20 thereby increasing the volume of the melt 20 and raising its level in the crucible 1. The crucible 1 is made of copper and is cooled, preferably by a water jacket (not shown) so that the melt will progressively solidify to form an ingot.

The housing 10 is also provided with a means 14 for communicating with a source of vacuum if it desired to melt the electrode compact 15 under vacuum. The electrical connections are not shown but will be attached to the electrode holder 2 and the crucible 1 and the controls will include the control of current to the electrode and the raising and lowering of the electrode holder 2 in response to the melt rate and height of the melt 20. The coating of the present invention is applied to the entire interior surfaces of the crucible 1 contacted by the melt 20.

In the vacuum arc melt method for the production of a pure zirconium ingot, a zirconium compact electrode is provided. The zirconium compact electrode is made up of cylindrical compacts of preselected sizes of zirconium metal chips or sponge scrap plate, chunks etc. or particles or granules, which cylinder sections are electron beam welded together, as is conventional practice, to form a predetermined electrode length.

A typical melt to form an 18,000 lb. ingot, which is 27 inches in diameter, is obtained by vacuum arc melting the zirconium electrode with approximately 35,000 amps in the sealed furnace. A typical melt of this size will be produced with a melt rate of electrode compact of about 60 to 100 lbs. per minute, without the coating of the present invention.

The observed melt rate observed when using a copper crucible coated with the composition of the present invention was approximately 90.8 lbs. per minute.

Further, the typical hydrogen level in the surface of a conventional ingot was about 7–9 ppm to about 50 ppm usually only in the bottom half of the ingot. Using the composition of the present invention, hydrogen levels have been consistently below about 5 ppm overall.

Finally, the scrap produced by squaring the ends of the ingot and scalping the surface by removing objectionable surface characteristics, and to form a smooth outer surface on the ingot, normally runs about 1,000 lbs. of scrap for recycle from each 18,000 lb. ingot. Using the composition of the present invention to coat the walls of the cooled copper receiving crucible, a smooth outer ingot surface was obtained. Since the hydrogen embrittlement is significantly reduced, there is little or no cracking and breaking of the surface during forging, so there is often no need to remove the surface to any depth or even to dress the ingot, and the scrap recycle is then reduced to essentially that which is created by squaring the ends of the ingot, which is about 100 lbs.

This startling improvement is also achieved in part by virtue of the fact that the zirconium compounds used in the formation of the composition of the present invention are essentially pure and Hafnium-free and do not contain aluminum and the impurities associated with aluminum, which all contribute to lowering the level of impurities on the ingot surface that can be present if conventional compositions are employed. This then, in concert with a smooth surface containing a low level of adsorbed hydrogen, dramatically reduces the need for surface treatment of the ingot, which treatment involves removing metal which increases scrap produced by the process, and makes the finished product costlier to produce.

The foregoing description is exemplary only and equivalents of compounds, method steps and apparatus may be employed consistent with the scope of the appended claims interpreted in view of the pertinent prior art.

I claim:

1. A binderless coating composition, free from allkaline and alkaline earth metallic oxides, hafnium, silica, and alumina, comprising substantially pure zirconium oxide suspended in an aqueous zirconyl nitrate and ammonium hydroxide gel.

2. The coating composition of claim 1, wherein zirconium oxide particles in said gel are sized from about 10 microns to about 1 micron.

3. The coating composition of claim 1 wherein the suspension of zirconyl nitrate in said gel is acidified at ambient temperature before application to a pH value of from about 3 to about 4.

4. The coating composition of claim 1 wherein the proportion of zirconyl nitrate to water is in the range of from about 1 Kg of zirconyl nitrate to about 5 liters of water and the amount of ammonium hydroxide is that amount which will produce a pH value of from about 8 to about 11.

5. The coating composition of claim 4, wherein the proportion of zirconium oxide to zirconyl nitrate is about from 3 to about 50 parts by weight of zirconium oxide to about 1 part by weight of zirconyl nitrate.

6. A method of making a binderless water based zirconium crucible coating composition comprising the steps of:

(a) dissolving zirconyl nitrate in the water;

(b) adding ammonium hydroxide to the aqueous solution containing zirconyl nitrate to form a gel having a pH value of from about 8 to about 11;

(c) adding sufficient substantially pure zirconium oxide free from alkaline and alkaline earth metallic oxides, hafnium, silica and alumina particles having a size of from about 10 microns to about 1 micron to said gel to form a suspension of zirconium oxide in said gel.

7. The method of claim 6 wherein said gel containing the suspension of zirconium oxide particles is acidified by the step of adding sufficient nitric acid to adjust the pH value of the gel suspension to a value of from about 3 to about 4.

* * * * *